Oct. 14, 1969 J. M. NOCITI ET AL 3,471,871

WASTE COLLECTION BAGS

Filed Jan. 31, 1967

INVENTORS
JOHN M. NOCITI
PHYLLIS E. RIELY

BY *Darby & Darby*

ATTORNEYS

United States Patent Office 3,471,871
Patented Oct. 14, 1969

3,471,871
WASTE COLLECTION BAGS
John M. Nociti, New York, and Phyllis E. Riely, Massapequa, N.Y., assignors to Fairchild Hiller Corporation, Hagerstown, Md., a corporation of Maryland
Filed Jan. 31, 1967, Ser. No. 613,031
Int. Cl. B65d 31/14, 31/18
U.S. Cl. 4—142
14 Claims

ABSTRACT OF THE DISCLOSURE

A bag for collecting material, such as human wastes, formed of impermeable material with a sealable vapor port through which the bag can be exhausted thereby controlling odor and contamination during waste collection and its contents dried after waste collection. The bag also has a closure for sealing its top, a splash guard to aid in the collection of liquid and semi-liquid wastes, and a cuff to enable the bag to be placed over a supporting container.

---

This invention relates to bags and more particularly to a novel bag usable for collecting human wastes such as urine, feces and vomitus, as well as other debris.

In many applications, it is desirable to have a bag for collecting human waste material in a manner to prevent the waste from contaminating the surrounding environment or, conversely, to prevent the waste material from being contaminated. One application for such a bag is in hospitals where waste must be collected for disposal, sampling, and testing. Another is in aircraft and space ship environments where disposal and/or further testing of the waste also presents a problem.

The present invention is directed to a bag of impermeable material having the capability of readily collecting any or all of the three most common types of human waste, urine, feces, vomitus, food and other debris. The bag of the present invention also has a sealable port which permits its use with an exhaust or vacuum system to aid in the collection of waste in a zero gravity environment, to reduce odors and to better hold the waste material placed into the bag. The same port also can be used at a later time to actuate or accommodate a dryer used to dry out the collected waste material. Further, the bag has a zipper type closure member for completely and easily sealing its top opening so that the waste material is isolated from the surrounding environment. In addition, a splash guard is provided across a portion of the top opening to aid in the collection of liquid and semi-liquid wastes.

An object of the present invention is to provide a novel bag for collecting waste material.

A further object is to provide a bag for collecting human waste material such as urine, feces, vomitus and other debris in an efficient manner.

An additional object is to provide a waste-collection bag designed for use with a vacuum system to insure that the waste and any odors produced thereby are confined to within the bag.

Another object is to provide a bag such that it can be used to dry the waste material collected, inactivate any bacteria remaining in the solid residue and preserve the residue for future analysis.

Other objects and advantages of the present invention will become more apparent upon reference to the following specification and annexed drawings, in which.

Figure 1:
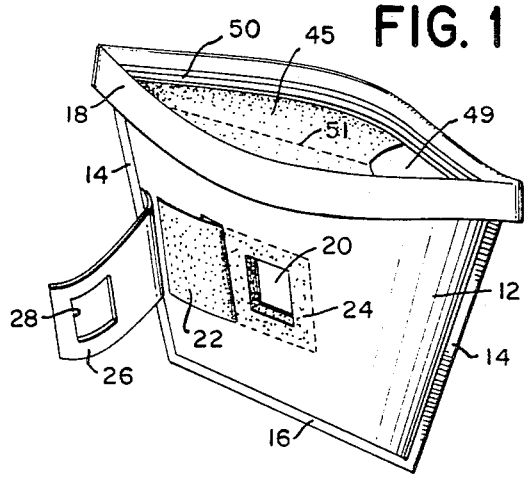
FIG. 1 is a perspective view of the novel waste collection bag of the present invention.
Figure 3:
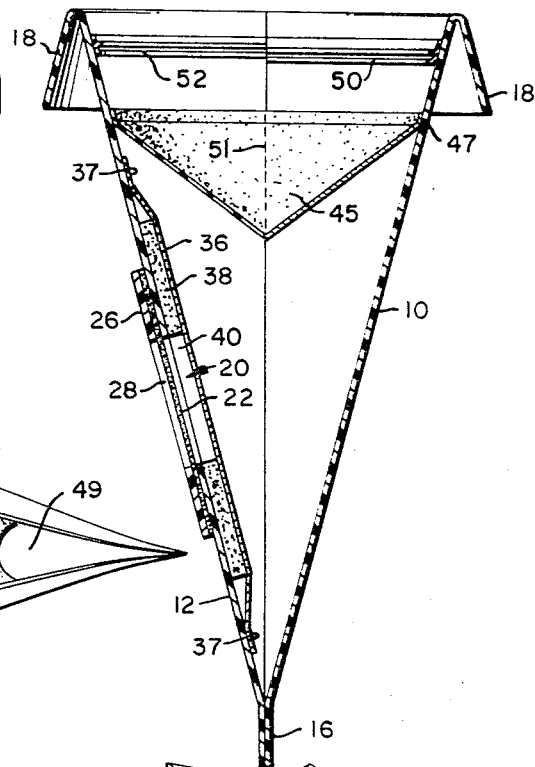
FIG. 3 is a cross-section of the bag taken along lines 3—3 of FIG. 2.
Figure 2:
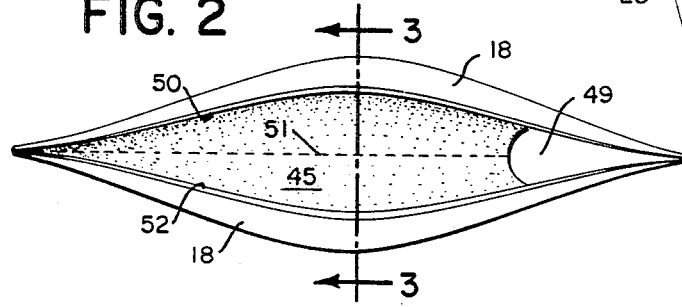
FIG. 2 is a top view of the bag.
Figure 4:
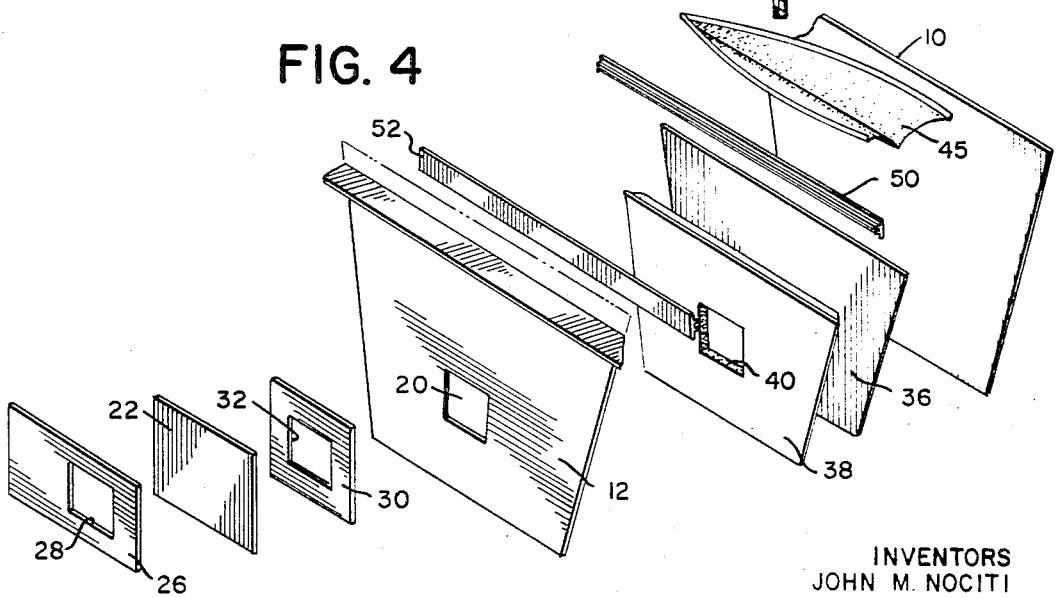
FIG. 4 is an exploded perspective view of the bag.

The waste collection bag of the present invention shown in FIGS. 1 through 4, includes a pair of outer sheets 10–12 of a liquid and gas impermeable material such as plastic having a suitable thickness to provide adequate strength, for example, .003 inch. The sheets 10 and 12 are preferably opaque to avoid any psychological difficulties which the user might experience upon viewing the waste material collected by the bag. Sheets 10 and 12 are fastened together at the sides 14 and the bottom 16. This can be accomplished by any suitable technique that will form a gas and liquid impermeable joint such as the use of adhesives, heat sealing, or stitching. The upper edge of the two sheets 10 and 12 are formed with a downwardly turned cuff 18 which surrounds the top of the bag and enables it to be placed over the surrounding edge of any suitable supporting receptacle (not shown).

One outer sheet 12 has a cut-out 20 which serves as a vapor port to permit air flow circulatiton or exhaust during waste collection and vapor escape during later processing, such as drying of the waste. When the bag is not to be used for waste collection or processing, the port 20 is sealed by a flap 22. The flap is also preferably an opaque plastic material which is held to sheet 12 by a quantity of pressure-sensitive adhesive placed on sheet 12 around the port 20 or directly on the under face of the flap. A protector sheet 26 protects the flap 22 when the bag is in use. One edge of the protector 26 is fastened to the sheet 12, such as by heat sealing, and the protector has an opening 28 corresponding to the port 20. When the bag is to be sealed, the protector sheet 26 is peeled back from the adhesive 24 and the flap 22 is sealed down over the port. When the bag is in use, the flap 22 is folded under protector 26 and adhesively held to the protector undersurface. The protector is then fastened down onto the adhesive area 24.

If desired, a doubler 30 (FIG. 4) with an opening 32 corresponding to the port 20 can also be secured to the outside or inside of sheet 12 around the opening 20. The doubler 30 is made of any suitable material, such as plastic or cardboard and it provides reinforcement for the sheet 12 around port 20 so that another piece of equipment, such as a vacuum hose, can be more easily matched to the bag. In this case, the outer face of the doubler, or the inner face of flap 22, would be coated with a pressure sensitive adhesive.

A filter panel 36 is attached to the inner wall of sheet 12 by any suitable technique, such as a suitable adhesive or heat sealing on the edges 37 of the panel. Filter panel 36 is spaced from the bag's inner wall by a filter spacer member 38 which has an opening 40 aligned with the port 20. The filter panel does not have a corresponding opening. The material for the filter 36 is preferably selectively permeable to pass gases but not liquids or bacteria in the presence of a pressure differential between the inside and the outside of the bag. One suitable material is Pallflex TV 20A40 which is a Teflon impregnated fiberglass cloth of approximately 0.0045 inch thickness and 5 micron pore size. Tests conducted with this filter have shown that it will not pass liquids at pressures up to a 0.5 p.s.i. differential. The filter spacer, which is a porous material non-resistant to gas flow and which can have a thickness of approximately one-eighth inch, prevents collapse of the filter against the bag and thereby provides maximum effective filter area. The latter is important to reduce the time required for later processing, e.g., drying, of the waste material.

A splashguard 45 is sealed around its upper edge 47 to the inside walls of the sheets 10 and 12. Splashguard 45 covers a substantial portion of the upper opening of the bag through which the wastes are collected leaving a small opening 49 which can be, for example, about two inches in diameter. The splashguard is formed preferably of a tearable material such as wet-strength paper and it has a perforation or score line 51 along its center.

The bags are designed for use by one or more persons to collect their urine, feces, vomitus and debris wastes. The bags of the present invention are so constructed to collect all of these wastes in a conventional earth-bound or a space environment (zero-gravity) without the need for special configurations. For example, the splashguard 45 provides a zero-gravity shield when the bag is opened and installed in a collection receptacle with port 20 communicating with a lower pressure source than the pressure on the remainder of the bag. During a urine or vomitus collection function, an airflow is set up through the waste collection opening 49 to the lower pressure source. The small opening and the airflow aid in collecting and containing the waste while the splashguard 45 prevents droplets or particles of the waste outside the airflow stream from escaping from the bag in a zero-gravity environment.

During vomitus collection, splashguard 45 acts as a nostril shield to preclude breathing the vomitus through the nostrils. The splashguard also serves to filter or block some of the vomitus odors.

When defecating, it is only necessary for the user of the bag to break the splashguard along the perforation line 51 with a finger or fingernail. This provides the maximum opening to collect the fecal wastes.

The installation of the bag within a fecal receptacle (not shown) positions the periphery of the bag to fit closely against the user's buttocks to assist in creating a high velocity airflow to ensure feces containment. When connected to exhaust pumps (low pressure source), the odors of the feces or other waste are removed from the bag through the filter panel without removing any of the waste material itself.

Similar advantages and uses of the bag are possible in an earth bound, gravity-type environment. Here, a low pressure source can be used to communicate with the bag interior through port 20 and the bag will function in the manner described above to produce the airflow through opening 49 and the odor elimination. When used without such a low pressure source, the bag still accomplishes waste collection of urine and vomitus through opening 49 and the splashguard 45 serves a useful function. As before, the splashguard is torn along line 51 to provide for feces collection.

Closure of the bag is accomplished by conventional type finger pressure operated extruded closure strips 50 and 52 which are fastened, such as by heat sealing, to the inner walls of sheets 10 and 12 near the top edge of cuff 18. The strips 50 and 52 have a mating ridge and groove arrangement and a leakproof seal is formed by pressing the two together. This permits the bag to be easily opened and closed so that, for example, it can be closed during the time it is not in use. The strips preferably are of a suitable plastic material which is compatible with the sheets 10 and 12 and the environment in which the bag is to be used. A flange (not shown) can be formed on one of the strips to facilitate opening of the bag by a simple lifting motion.

As should be apparent, a novel bag has been disclosed which is particularly useful for the collection of human waste which readily permits disposal or storage for further processing.

What is claimed is:

1. A bag formed with a pair of opposed side walls fastened together at their ends to define an open top and a closed bottom, and a splashguard fastened between the opposed side walls of said bag covering a portion of said open top to provide a reduced size opening adjacent one end of the bag at the fastening point at the two opposed walls.

2. A bag as in claim 1 wherein said splashguard is formed of a tearable material so that said opening can be enlarged.

3. A bag as in claim 2 wherein said splashguard has perforations therein to facilitate the tearing thereof.

4. A bag as in claim 2 wherein selfsealing means are provided to hold said two opposed walls together to close said top.

5. A bag as in claim 4 wherein a cuff is formed around the top thereof to enable the bag to be placed within a container.

6. A bag having an open top and a closed bottom and a port formed in a wall thereof through which the interior of the bag can communicate to a pressure source of a predetermined magnitude to create an airflow through the open top, and means attached to said wall for sealing said port.

7. A bag as in claim 6 wherein said bag is formed of liquid impermeable material.

8. A bag as in claim 6 further comprising a filter panel on the interior thereof covering said port.

9. A bag as in claim 8 further comprising means on said wall and surrounding at least a portion of said port for spacing a portion of the filter panel away from the wall of the bag having said port.

10. A bag as in claim 11 further comprising means on the exterior of said one wall for sealing said port.

11. A bag having an open top and a closed bottom and a port formed in a wall thereof through which the interior of the bag can communicate to a pressure source of reduced magnitude, a splashguard fastened to the bag covering a portion of said open top to provide a reduced size opening through which airflow takes place when a pressure differential exists between the port and the environment exterior of the bag.

12. A bag as in claim 11 wherein said splashguard is formed of a tearable material.

13. A bag as in claim 11 wherein self-sealing means are provided to close said top.

14. A bag as in claim 13 wherein a cuff is formed around the top thereof to enable the bag to be placed within a container.

References Cited

UNITED STATES PATENTS

| 2,606,327 | 8/1952 | Eckart et al. | 4—112 |
| 3,122,306 | 2/1964 | Davey | 229—53 |
| 3,323,442 | 6/1967 | Rader | 229—53 |
| 3,346,883 | 10/1967 | Ersek | 4—142 |

PATRICK D. LAWSON, Primary Examiner

U.S. Cl. X.R.

229—53